US006625274B1

United States Patent
Hoffpauir et al.

(10) Patent No.: US 6,625,274 B1
(45) Date of Patent: Sep. 23, 2003

(54) COMPUTER SYSTEM AND METHOD FOR PROVIDING SERVICES TO USERS OF COMMUNICATION SYSTEMS USING SERVICE ENTITIES, INTERFACE ENTITIES, AND A SERVICE BUS

(75) Inventors: Scott Hoffpauir, Gaithersburg, MD (US); Jeffrey L. Jordan, Memphis, TN (US)

(73) Assignee: BroadSoft, Inc., Gaithersburg, MD (US)

( * ) Notice: Subject to any disclaimer, the term of this patent is extended or adjusted under 35 U.S.C. 154(b) by 0 days.

(21) Appl. No.: 09/418,130

(22) Filed: Oct. 12, 1999

(51) Int. Cl.[7] .............................. H04M 7/00; H04M 3/42
(52) U.S. Cl. .................................. 379/229; 379/201.12
(58) Field of Search ...................... 379/201.01–201.03, 379/201.12, 207.02, 229, 230; 709/223, 224, 312, 313, 318, 520

(56) References Cited

U.S. PATENT DOCUMENTS 5,442,690 A * 8/1995 Nazif et al. ............. 379/201.03
5,511,116 A * 4/1996 Shastry et al. ............... 345/700

FOREIGN PATENT DOCUMENTS

EP   0 810 799   12/1997

OTHER PUBLICATIONS

M. Elixmann and J. Fischer, "Service Creation Environment—A Development Environment for Services in the Intelligent Network," *Philips Telecommunication Review*, vol. 50, No. 1, Mar. 1992, pp. 34–38.

G.D. Turner, "Service Creation," *BT Technology Journal*, vol. 13, No. 2, Apr. 1995, pp. 80–86.

M. Genette, "Service Creation Environment: Flexibility, Openness and Evolution," *Electrical Communication, Be, Alcatel. Brussels*, Jan. 1999, pp. 53–59.

* cited by examiner

Primary Examiner—Benny Tieu
(74) Attorney, Agent, or Firm—Venable; Michael A. Sartori

(57) ABSTRACT

A system for providing services includes service entities, interface entities, and a service bus. Each service entity produces and receives events and includes at least one of a reusable macro function, an application programming interface function, and a management interface function. Each service is implemented with at least one service entity. Each interface entity produces and receives events and is coupled to a communication system and communicates with the communication system using a communication protocol. The service bus couples the interface entities and the service entities and passes events between the interface entities and service entities.

21 Claims, 9 Drawing Sheets

COMPUTER SYSTEM AND METHOD FOR PROVIDING SERVICES TO USERS OF COMMUNICATION SYSTEMS USING SERVICE ENTITIES, INTERFACE ENTITIES, AND A SERVICE BUS

BACKGROUND OF THE INVENTION

1. Field of the Invention

The invention relates to a system for providing services, and, more particularly, to a computer system for providing services to users of communication systems using service entities, interface entities, and a service bus.

2. Background of the Invention

Conventionally, services are provided to a user of a telephone system using a top-down approach. FIG. 14 illustrates a system perspective for providing services using the prior art. A service provider 201 provides services to a user 202 via a telephone system 203. The service provider 201 includes an operating system 204, services 205, and a network interface 206. The services 205 are implemented in software as stand-alone services. New services are provided by either adding new stand-alone services 205 to an existing service provider 201 or by adding an entirely new service provider. Examples of services for a telephone system implemented with the prior art approach include a call forwarding service and a call waiting service.

With the conventional approach of FIG. 14, a single network interface 206 is used for each service provider 201, which means that each service provider 201 may only communicate with a single telephone system 203. Also, with the conventional approach, management of the services and network interfaces between service providers is disjoint, which causes an increase in management expenses.

In the conventional system as illustrated in FIG. 14, the deployment of new services typically takes a long time, and there are conventionally no consistent or standardized approaches for the deployment of new services.

Further, the deployment of new services in the conventional manner typically has several problems. For example, a new service is created by a service manufacturer in a closed and proprietary manner, and the augmentation of the deployed new service is difficult to perform and is restricted by the service manufacturer that created the service. In addition, the delivery of a new service created by a service manufacturer is difficult to predict because the service manufacturer operates on its own independent delivery schedule.

Additionally, when deploying a new service with the conventional approach, the new service is often introduced without considering the current deployment of existing services. Further, the interaction of a new service and an existing service is difficult to accomplish if the services are implemented with two different service providers. Moreover, when a new service is deployed, the service provider implementing the new service requires a large amount of maintenance overhead and provisioning. Provisioning is the configuration of data and/or information pertaining to the implemented service.

There exists a need to make providing services to users more efficient and a need to introduce new services more easily.

SUMMARY OF THE INVENTION

An object of the invention is to provide a computer system for providing services to a user using a communication system.

An object of the invention is to deploy new services quickly and inexpensively.

An object of the invention is to provide a scalable system for providing services.

An object of the invention is to provide a system that allows for easily creating, managing, and executing new services.

An object of the invention is to provide a system for providing services that enables operators and third parties to develop new services.

The invention includes a system, a method, and an article of manufacture for providing services.

The system of the invention includes a computer system having a computer-readable medium embodying software to operate a computer. The system includes software-implemented service entities, software-implemented interface entities, and a software-implemented service bus. Each service entity produces and receives events and includes at least one of a reusable macro function, an application programming interface function, and a management interface function. Each service entity corresponds to a user subscription to a service. Each interface entity produces and receives events and is coupled to a communication system and communicates with the communication system using a communication protocol. The service bus couples the interface entities and the service entities and passes events between the interface entities and service entities.

The method of the invention includes a method for operating a computer system for providing services having a computer-readable medium embodying software to operate a computer. The software includes software-implemented service entities, software-implemented interface entities, and a software-implemented service bus. A first service entity and a first interface entity are coupled to the service bus. A first event is passed from the first interface entity to the first service entity via the service bus. A second event is passed via the service bus from the first service entity to the first interface entity, a second interface entity coupled to the service bus, or a second service entity coupled to the service bus.

The system of the invention includes a computer system having a computer-readable medium embodying software to operate a computer in accordance with the invention.

The article of manufacture of the invention comprises a computer-readable medium embodying software to operate a computer in accordance with the invention.

The above objects and advantages of the invention are illustrative, and not exhaustive, of those which can be achieved by the invention. Thus, these and other objects and advantages of the invention will be apparent from the description herein, or can be learned from practicing the invention both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1:
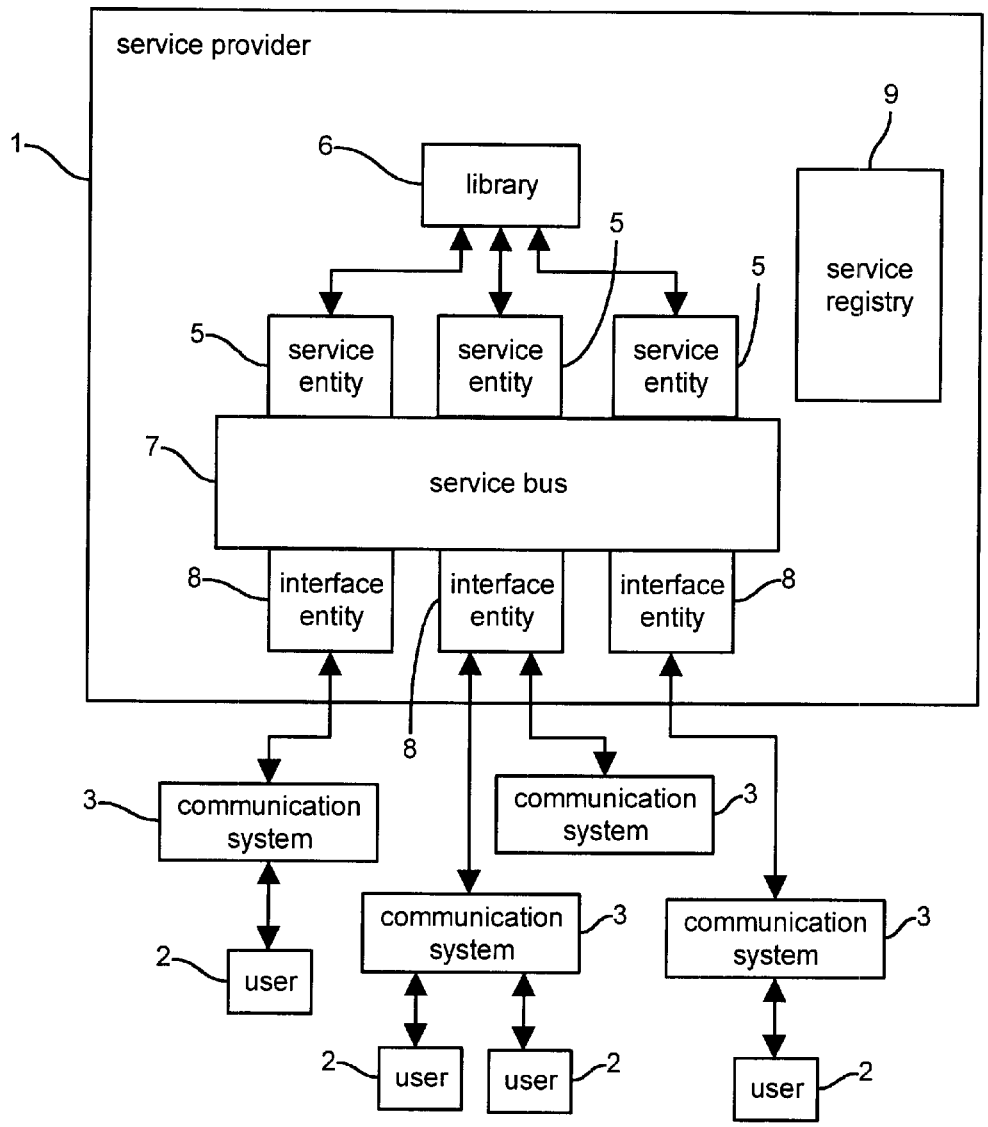
FIG. 1 illustrates a system perspective for providing services using the invention.

The description of the invention is segmented into sections on definitions, providing services, and examples.

Definitions

In describing the invention, the following definitions are applicable throughout.

A "session" refers to an organized communication period between a user and one or more users or communication systems. Examples of sessions include: outgoing calls; bundled long distance calls; incoming calls; fax/data support; plain ordinary telephone service (POTS) services; web-based management; 911/lawful intercept services; equal access services, which includes the ability for a user to select their long distance carrier, ensuring competition among carrier; custom local access subscriber services (CLASS) features; lifeline power, which includes the ability to power a telephone from the telephone service provider and the ability to use the telephone without an electrical outlet; Centrex services, which includes telephone services for small to medium size businesses; videocalls; and multimedia conferencing.

A "service" refers to a communication-related service used during a session. A session uses zero or more services. Examples of types of service include: telephony services, such as call forwarding number service and a call waiting service; data services; media conversion services; conferencing services; information services; and messaging services.

A "communication system" refers to a computer system used for communicating. Examples of a communication system include: an e-mail service system, a directory service system, a credit card payment service system, a cable set top box (CSTB), a voice mail system, a voice messaging system, a speech recognition unit, a text-to-speech unit, a record and playback server, a paging system, a conferencing unit, a remotely controlled conferencing unit, an interactive voice response unit, a fax unit, a personal information managing system, a wireless device, a network, a network gateway, a unit for connecting a telephony network and a packet network, a unit for guaranteeing a path through a packet network, a security device, and a home appliance.

A "communication protocol" refers to a set of rules or standards designed to enable a computer to connect with another computer and to exchange information with another computer with as little error as possible. Communication protocols can be used for exchanging information with a communication system using various types of messaging, such as wire line messaging, wireless messaging, cable messaging, carrier messaging, and data messaging. Examples of a communication protocol include following: advanced intelligent networking (AIN), which is used for communicating between a switching system and a service control point; intelligent networking (IN) capability set 2 (CS-2), which is used for communicating between a switching system and a services control point; custom application management for enhanced logic (CAMEL), which is used for communicating between a wireless switching system and a services control point; short messaging service (SMS), which is used for communicating with a wireless system for sending short text messages to wireless devices; wireless application protocol (WAP), which is used for allowing wireless devices access to a network, such as the Internet or an intranet; telephony application programming interface (TAPI), which is used for allowing an application to control basic telephony functions of a phone or PBX; simple mail transfer protocol (SMTP), which is used for sending e-mail from one system to another system; session initiation protocol (SIP), which is used for signaling between Internet protocol (IP) telephony end points and servers; lightweight directory application protocol (LDAP), which is used for retrieving directory information; H.323, which is used for communicating between IP telephony end points and servers; and real time streaming protocol (RTSP), which is used for communicating and controlling a media server.

A "computer" refers to an apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a microcomputer; a server; an interactive television; and a hybrid combination of a computer and an interactive television. A computer also refers to two or more computers connected together via a network for transmitting or receiving information between the computers. An example of such a computer includes a distributed computer system for processing information via computers linked by a network.

A "computer-readable medium" refers to a storage device used for storing data accessible by a computer. Examples of a computer-readable medium include: a magnetic hard disk; a floppy disk; an optical disk, such as a CD-ROM; a magnetic tape; a memory chip; and a carrier wave used to carry computer-readable electronic data, such as those used in transmitting and receiving e-mail or in accessing a network. "Software" refers to prescribed rules to operate a computer. Examples of software include: software; code segments; instructions; computer programs; and programmed logic.

A "computer system" refers to a system having a computer, where the computer includes a computer-readable medium embodying software to operate the computer.

A "network" refers to a number of computers and associated devices that are connected by communication facilities. A network involves permanent connections, such as cables, or temporary connections, such as those made through telephone or other communication links. Examples of a network include: an internet, such as the Internet; an internet; a local area network (LAN); a wide area network (WAN); and a combination of networks, such as an internet and an intranet.

Providing Services

FIG. 1 illustrates a system perspective for providing services using the invention. A service provider 1 implements communication sessions for users 2. Each user 2 uses a communication system 3 to communicate with other users 2 and other communication systems 3.

The service provider 1 provides services for use by the users 2. The service provider 1 provides the services to users 2 using software-implemented service entities 5, a software-implemented library 6, a software-implemented service bus 7, software-implemented interface entities 8, and a software-implemented service registry 9.

Figure 5:
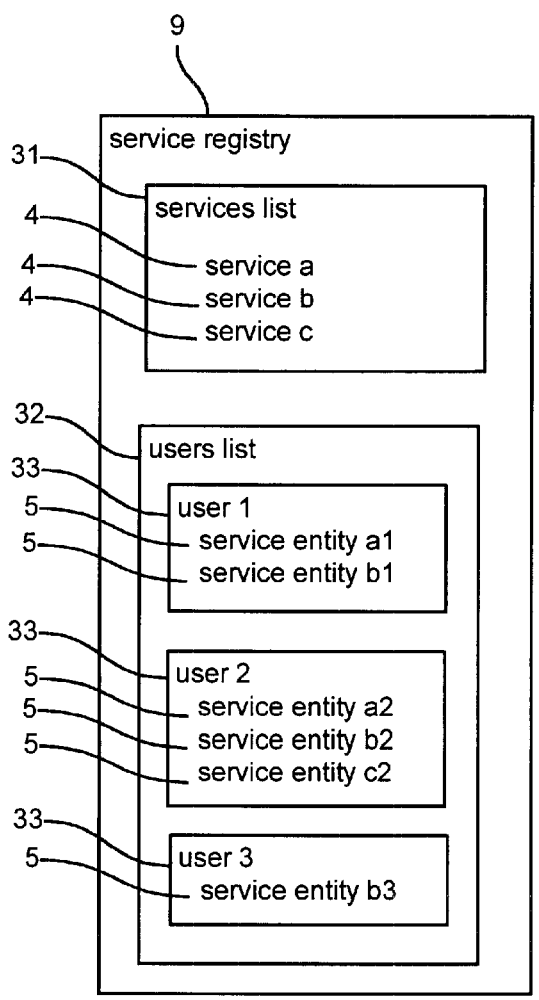
FIG. 5 illustrates a service registry.

Each service is implemented by the service provider 1 using one or more service entities 5. Each service entity 5 represents a subscription by a user 2 to a particular service. As illustrated in FIG. 5 and discussed further below, the service registry 9 tracks the services 4 offered by the service provider 1 and the service entities 5 for each service 4. Service entities 5 are implemented using functions accessed from the software-implemented library 6.

The service bus 7 passes events between the service entities 5 and the interface entities 8. Each service entity 5 produces and receives events, and each interface entity 8 produces and receives events. An event is an action or occurrence, often generated by a user, to which a service entity or an interface entity might respond.

An interface entity 8 communicates with one or more communication systems 3, and a communications system 3 communicates with zero or more users 2.

The service provider 1 is implemented using a computer system having a computer-readable medium embodying software to operate a computer. Per the definition of a "computer," the various components of the service provider 1 can be implemented on a single computer or distributed on two or more computers across a network. For example, each of the service entities 5, the library 6, the service bus 7, each of the interface entities 8, and the service registry 9 can each be implemented on a single computer or distributed on two or more computers across a network.

The service provider 1 is preferably implemented using internet development tools or common object request broker architecture (CORBA) tools. Examples of internet development tools include: the platform independent programming language Java; integrated development environments (IDEs), such as Jbuilder and Visual Café; and Java tools, such as Java Beans.

Due to the modular nature of the invention with respect to the service entities and the interface entities, the service entities and the interface entities can be developed by various parties using off-the-shelf software or specially created software. Further, the structure of the service provider 1 is scalable, and new service entities and new interface entities are easily added to the service provider 1.

Figure 2:
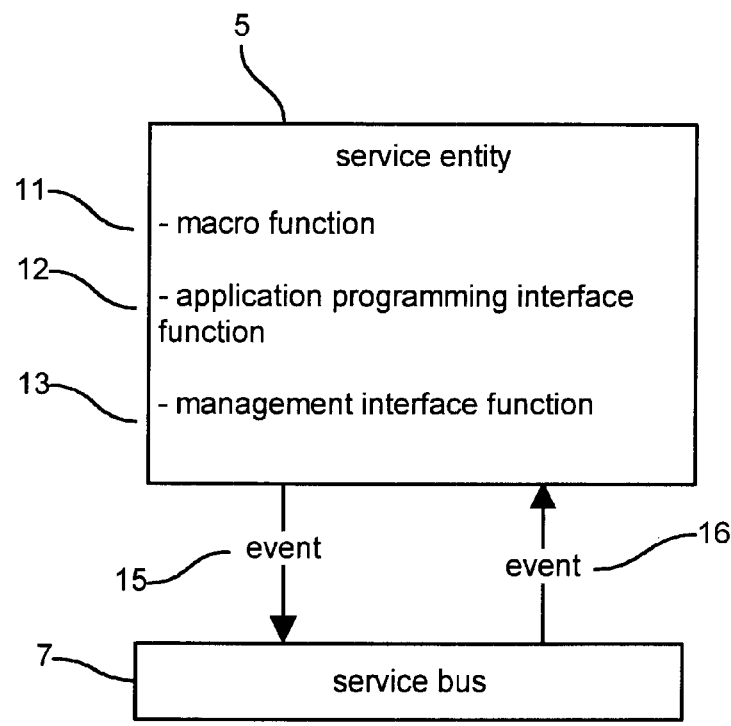
FIG. 2 illustrates a service entity.

FIG. 2 illustrates a service entity 5. A service entity 5 represents a subscription by a user 2 to a service 4. The service entity 5 includes a number of functions. For example, the service entity 5 includes at least one of the following functions: a macro function 11, an application programming interface (API) function 12, and a management interface function 13. The functions of a service entity are reusable, which means they can be used by other service entities via the library 6.

The reusable macro function 11 represents a commonly used sub-routine. The application programming interface function 12 represents a programming interface to an external protocol. The management interface function 13 is a function that provides for at least one of provisioning, monitoring, and modification of a service entity. The provisioning of a service entity allows the user or service provider to modify data and/or information associated with the service The monitoring of a service entity allows the user or service provider to gauge the usage and status of the service using statistics and indicators. The modification of a service entity allows the service provider to change data associated with the service which changes the behavior of the service for all subscribers.

The service entity 5 receives an event 16 from the service bus 7. Based on the received event 16, the service entity 5 produces at least one event 15 using the functions 11–13 and passes the event 15 to the service bus 7.

Figure 3:
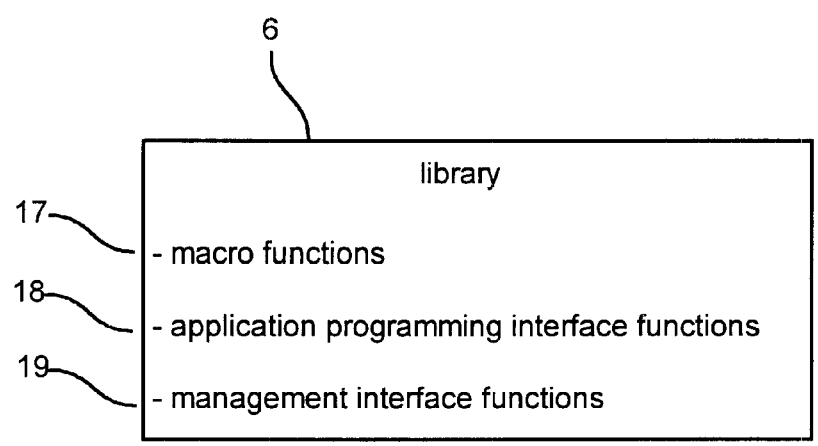
FIG. 3 illustrates a library.

FIG. 3 illustrates the library 6. The library 6 stores many of the functions used to implement the service entities 5. For example, the library 6 stores reusable macro functions 17, application programming interface functions 18, and management interface functions 19. The reusable macro functions 17 in the library 6 include the reusable macro function 11 in the service entity 5 of FIG. 2, the application programming interface functions 18 include the applications programming interface function 12 in the service entity 5 of FIG. 2, and the management interface functions 19 in the library 6 include the management interface function 13 in the service entity 5 of FIG. 2. Service entities 5 are built using the functions provided by the library.

Figure 4:
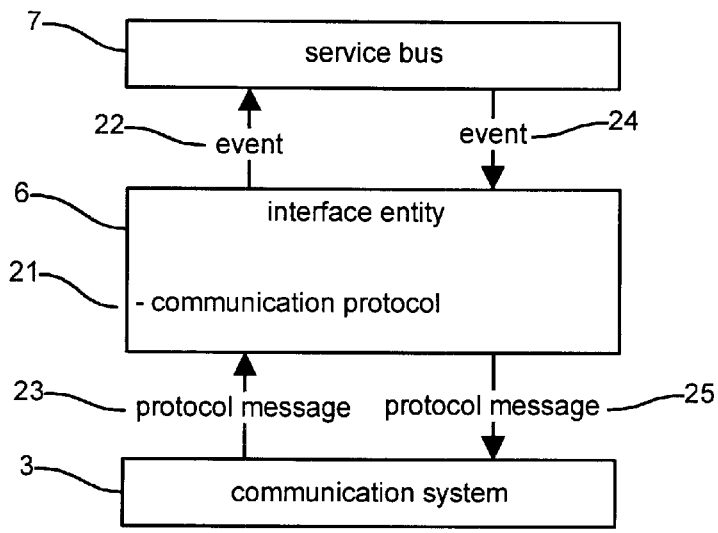
FIG. 4 illustrates an interface entity.

FIG. 4 illustrates an interface entity 6. The interface entity 6 uses a communication protocol 21 to communicate between the service bus 7 and one or more communication systems 3. After receiving a protocol message 23 from the communication system 3, the interface entity 6 produces at least one event 22 using the communication protocol 21, and the interface entity 6 passes the event 22 to the service bus 7. After receiving an event 24 from the service bus 7, the interface entity 6 produces a protocol message 25 using the communication protocol 21 and passes the protocol message 25 to at least one communication system 3.

FIG. 5 illustrates a service registry 9. With the service registry 9, the service provider 1 tracks the services 4 offered by the service provider 1, the users 2 authorized to access the service provider 1, and the services 4 that each user 2 is authorized to access. The services registry 9 includes a services list 31 of services 4 that the service provider 1 offers. The service registry 9 also includes a users list 32 of users 33 that are authorized to access the service provider 1. Each user 33 listed in the users list 32 includes a list of the service entities 5 that the user 33 is authorized to access. When a user 33 subscribes to a new service 4, the service registry 9 creates a new service entity 5 for the user corresponding to the newly subscribed service and lists the new service entity 5 in the users list 32. When a user cancels a subscription to a service, the corresponding service entity 5 is removed from the users list 32 for the user.

As an example, the service registry 9 illustrated in FIG. 5 has an exemplary services list 31 and an exemplary users list 32. The services list 31 includes three services 32, service a, service b, and service c. The users list 32 includes three users 33, user 1, user 2, and user 3. User 1 has subscribed to two services 4, service a and service b, and two corresponding service entities 5, service entity a1 and service entity b1, are listed with user 1 in the service registry 9. User 2 has subscribed to three services 4, service a, service b, and service c, and three corresponding service entities 5, service entity a2, service entity b2, and service entity c2, are listed with user 2 in the service registry 9. User 3 has subscribed to one service 4, service b, and one corresponding service entity 5, service entity b3, is listed with user 3 in the service registry 9.

Figure 6:
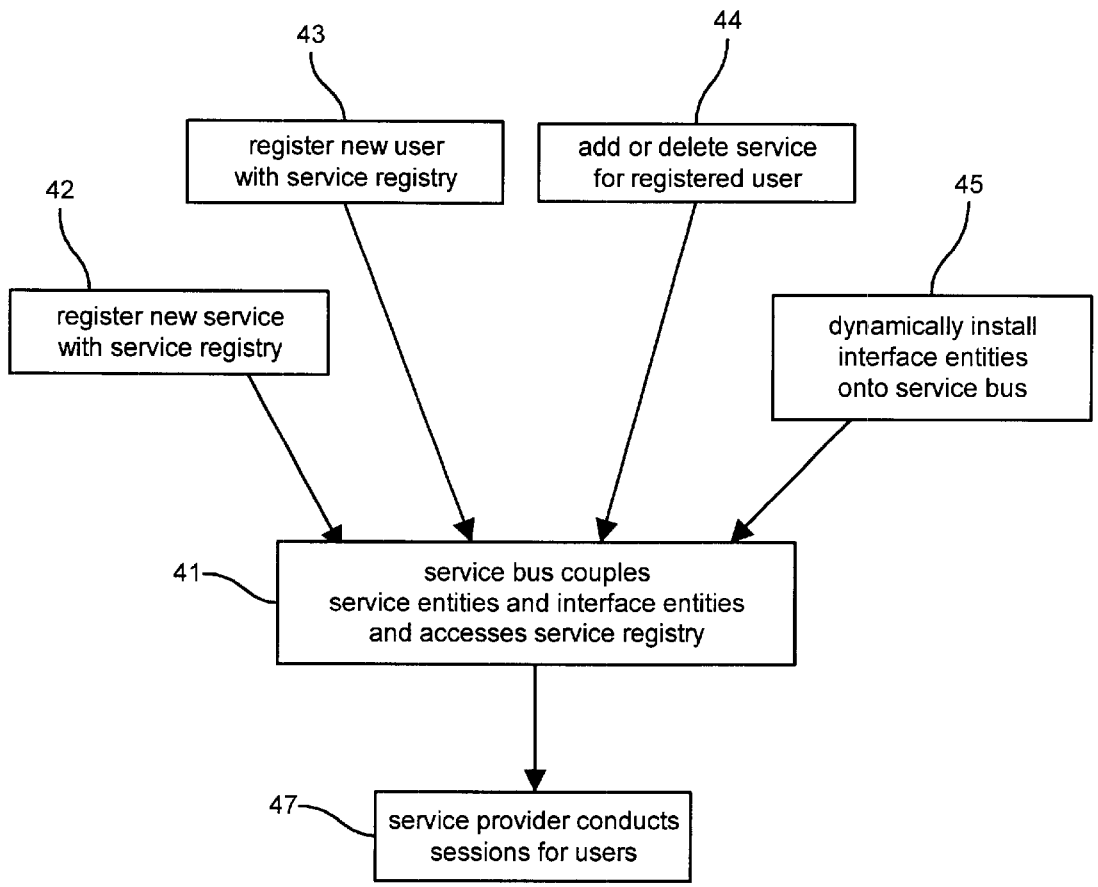
FIG. 6 illustrates a flow diagram for providing services with respect to the system perspective of FIG. 1.

FIG. 6 illustrates a flow diagram for providing services with respect to the system perspective of FIG. 1. In block 41, the service bus 7 exists as is illustrated in FIG. 1. The service bus 7 couples service entities 5 and interface entities 8 and accesses the service registry 9.

In block 42, a new service is registered with the service registry 9. The services list 31 of FIG. 5 is updated with the new service 4.

In block 43, a new user is registered with the service registry 9. The users list 32 is updated with the new user 33, and the new user 33 lists the service entities 5 corresponding to the services 4 to which the new user 33 has subscribed. A user subscribes to zero or more services 4, and the number of service entities 5 listed for the user 33 corresponds to the number of services to which the user has subscribed.

In block 44, a new service is added or canceled for a registered user listed in the service registry 9. A user 33 is registered with the service provider 1 and is listed in the service registry 9. The user 33 wishes to add or cancel a service 4 provided by the service provider 1. To add a service 4, the users list 32 is amended by adding a new service entity 5 corresponding to the desired new service 4 for the user 33. To cancel a service 4, the users list 32 is amended by deleting the service entity 5 corresponding to the canceled service 4 for the user 33.

In block 45, a new interface entity is dynamically installed onto the service bus. A new interface entity is needed if the service provider 1 is to interface with a communication system 3 that uses a communication protocol that is not supported by any of the existing interface entities 8. The new interface entity includes a new communication protocol 21 for interfacing with the new type of communication system. In dynamically installing the new interface entity, the new interface entity is installed without impacting the operation of the existing service entities 5, existing interface entities 8, and the service bus 7. Further, by dynamically installing the new interface entity, the service bus 7 does not need to be reset.

In block 47, the service provider 1 conducts sessions with users 2. The service provider 1 is capable of conducting one or more sessions at a time. The process for conducting a session is illustrated in FIG. 7.

Figure 7:
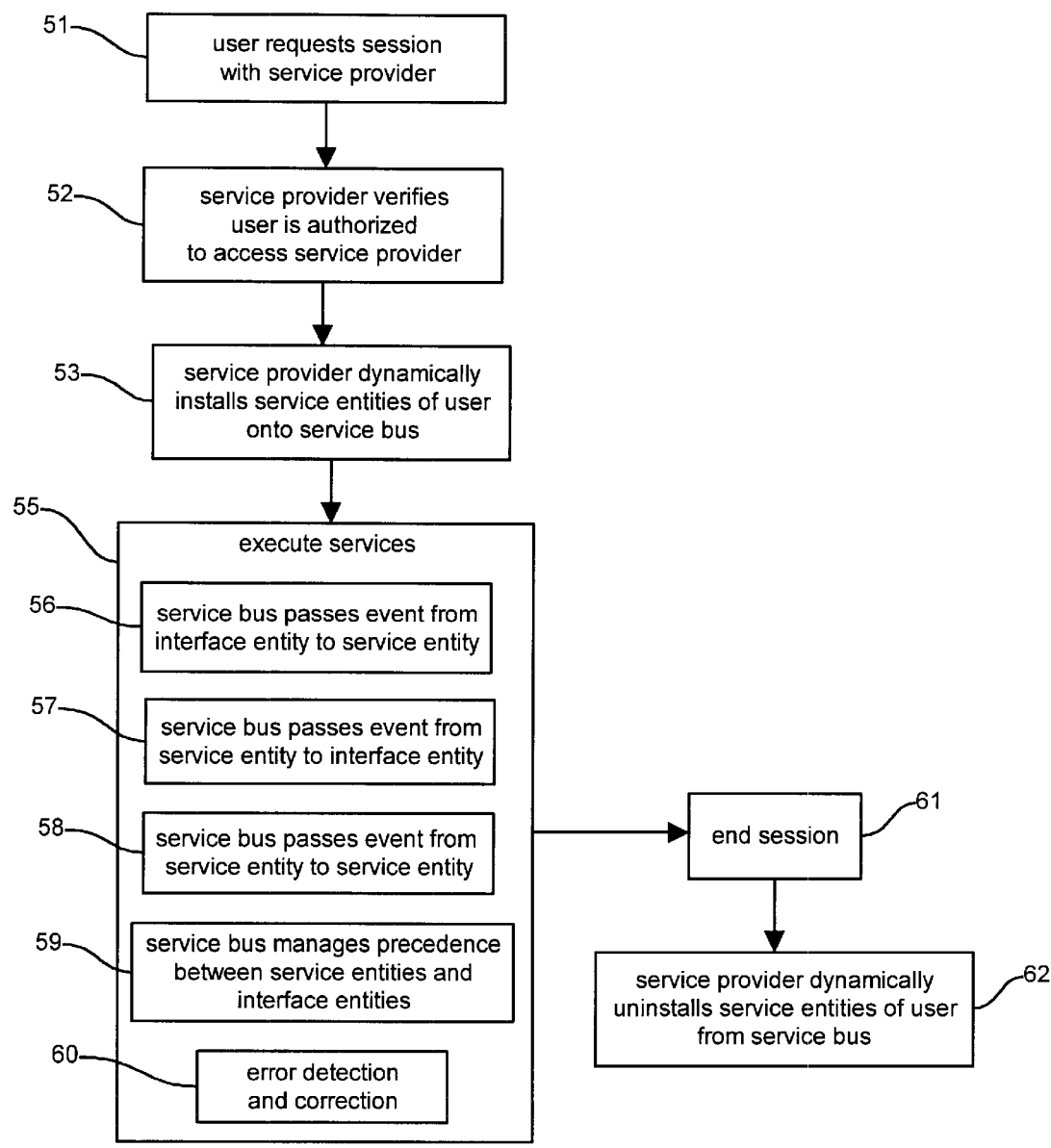
FIG. 7 illustrates a flow diagram for conducting a session.

FIG. 7 illustrates a flow diagram for conducting a session. In block 51, a user 2 requests a session with the service provider 1. The request passes from the user 2 to the service bus 7 via a communication system 3 and an interface entity 8.

In block 52, the service provider 1 verifies that the user 2 is authorized to access the service provider 1. The service bus 7 accesses the service registry 9 to verify that the user 2 is listed as a user 33 in the users list 32. If the user is listed as a user 33 in the users list 32, the flow proceeds to block 53. If the user is not listed as a user 33 in the users list 32, the user is denied access to the service provider 1.

In block 53, the service provider 1 dynamically installs the one or more service entities 5 of the user 2 onto the service bus 7. The service provider 1 accesses the users list 32 in the service registry 9 to determine the service entities 5 to dynamically install onto the service bus 7. When a service entity is dynamically installed onto the service bus, the service entity informs the service bus as to which one or more interface entities the service entity requires for proper operation. If the requested interface entities are not already installed onto the service bus, the service provider 1 dynamically installs the requested interface entities onto the service bus. In dynamically installing the one or more service entities, the service entities are installed without impacting the operation of the existing service entities 5, existing interface entities 8, and the service bus 7. Further, by dynamically installing the service entities, the service bus 7 does not need to be reset.

In block 55, the service provider 1 executes the requested service. The functions 11–13 of each service entity 33 for the requested service 32 are accessed, as appropriate, from the functions 17–19 in the library 6.

To execute the requested service, the service provider 1 performs one or more functions, as illustrated in blocks 56–60 of FIG. 7. In block 56, the service bus 7 passes an event from an interface entity 8 to a service entity 5. This is the initial step for almost all services. In block 57, the service bus 7 passes an event from a service entity 5 to an interface entity 8. In block 58, the service bus passes an event from a service entity 5 to another service entity 5.

In block 59, the service bus 7 manages precedence between the service entities 5 and interface entities 8. For instance, if an event is to be passed to two or more service entities 5 or interface entities 8, the service bus 7 determines the order of service entities 5 and interface entities 8 that are to receive the event. Also, each service entity can change the flow by altering the event, consuming the event, or allowing the event back out to the service bus 7, where the next service entity will process it. If the service bus 7 cannot manage interactions between two or more entities, the service bus 7 dynamically installs an interaction service entity onto the service bus. The interaction service entity determines how two or more particular service entities interact given the current state and environment of the service bus 7.

In block 60, the service provider 1 performs error detection and correction, which is discussed further below with respect to FIGS. 8 and 9.

Initially, an event is passed from an interface entity to a service entity via the service bus and as determined by the service bus. After the event has been processed by all applicable service entities, the session is suspended awaiting the next event from an interface entity.

In block 61, the session with the service provider 1 ends, and the user 2 is disconnected from the service provider 1. The session ends when, for example, the user 2 hangs up the telephone.

In block 62, the service provider 1 dynamically uninstalls the service entities 5 for the user 2 from the service bus 7. The service provider 1 further dynamically uninstalls the interface entities 8 that are not required by any of the service entities 5 that remain installed on the service bus 7. In dynamically uninstalling the one or more service entities 5 for the user 2 and any interface entities 8, the service entities and any interface entities are uninstalled without impacting the operation of the existing service entities 5, existing interface entities 8, and the service bus 7. Further, by dynamically uninstalling the service entities and any interface entities, the service bus 7 does not need to be reset.

Figure 8:
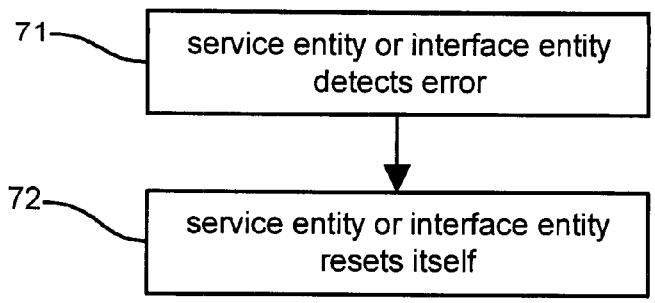
FIG. 8 illustrates a flow diagram for error detection and correction.

FIG. 8 illustrates a flow diagram for error detection and correction for use with block 60 in FIG. 7. In block 71, a service entity 5 or an interface entity 8 detects an error. Examples of an error include: receiving an incorrect event from the service bus; receiving an improperly formatted event; or receiving an unexpected event. An error is detected by a service entity or interface entity, which notifies the service bus of the error.

In block 72, the service entity 5 or interface entity 8 that detected the error resets itself. The detecting service entity 5 or interface entity 8 resets itself by taking a service specific action to recover gracefully from the error.

Figure 9:
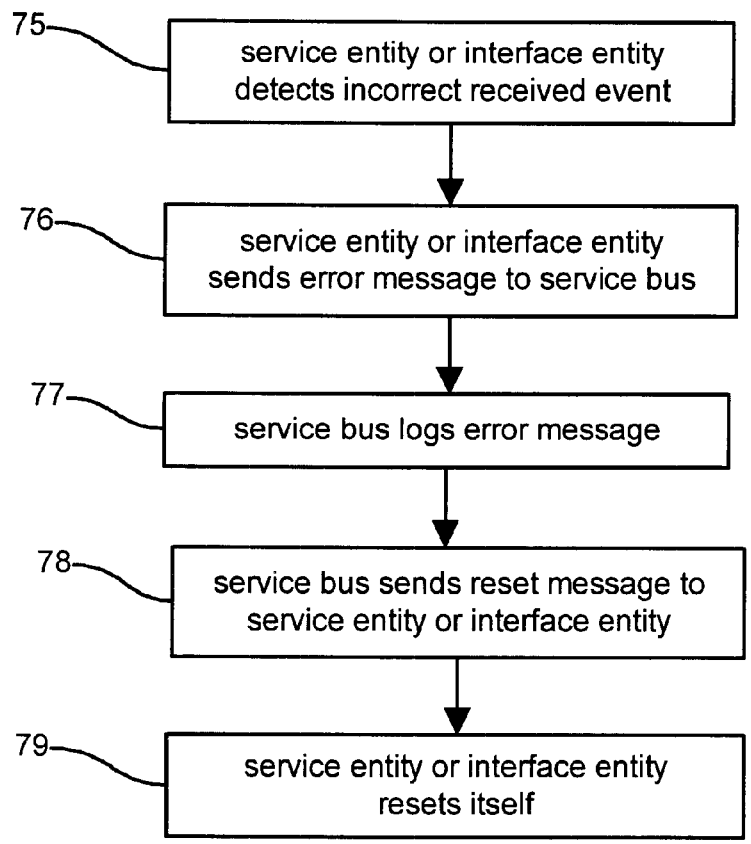
FIG. 9 illustrates a flow diagram for error detection and correction.

FIG. 9 illustrates a flow diagram for error detection and correction for use with block 60 in FIG. 7. In block 75, a service entity. 5 or an interface entity 8 detects an incorrect received event from the service bus 7. The service entity 5 or interface entity 8 expected to receive a certain type of event from the service bus 7, and instead received a different event.

In block 76, the service entity 5 or interface entity 8 that detected the error sends an error message to the service bus 7. For example, the error message is an unexpected event.

In block 77, the service bus logs the error message. The error message is logged by an event management system of the service provider 1, which is not shown in FIG. 1.

In block 78, the service bus 7 sends a reset message to the service entity 5 or interface entity 8 that detected the error. For example, the reset message is a reset event.

In block 79, the service entity 5 or interface entity 8 that detected the error resets itself, as in block 72.

Figure 10:
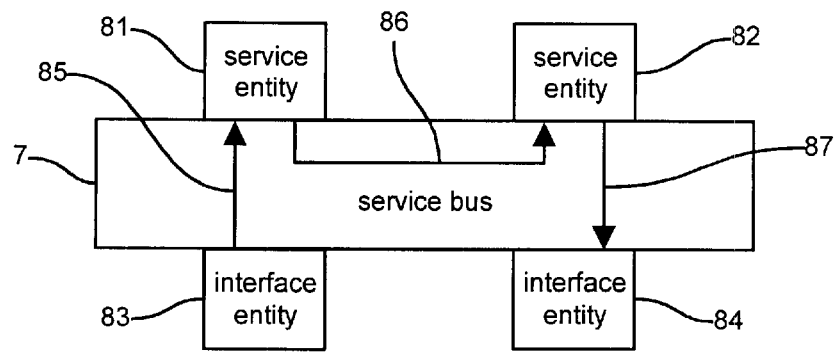
FIG. 10 illustrates passing events.
Figure 11:
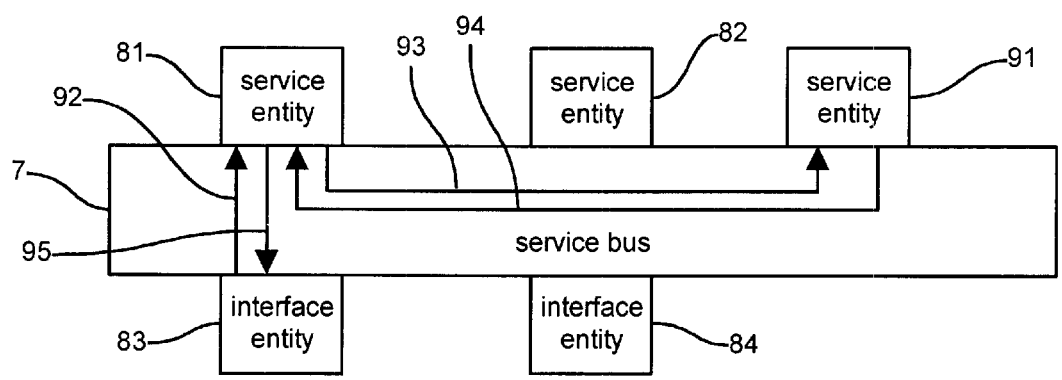
FIG. 11 illustrates passing events.

FIGS. 10 and 11 illustrate passing events using the service bus 7. For clarity, the remaining components of the system perspective illustrated in FIG. 1 are not depicted in FIGS. 10 and 11. FIGS. 10 and 11 illustrate three basic types of event passing: the service bus passing an event from an interface entity to a service entity; the service bus passing an event from a service entity to an interface entity; and the service bus passing an event from a service entity to another service entity.

FIG. 10 illustrates a service implemented by service entities 81 and 82. In FIG. 10, the service bus 7 couples the two service entities 81 and 82 and two interface entities 83 and 84. The interface entity 83 produces an event 85, which is passed to the service entity 81 via the service bus 7. After receiving the event 85, the service entity 81 produces an event 86, which is passed to the service entity 82 via the service bus 7. After receiving the event 86, the service entity 82 produces an event 87, which is passed to the interface entity 84 via the service bus 7.

FIG. 11 illustrates a service implemented by service entities 81 and 91. In FIG. 11, the service bus 7 couples three service entities 81, 82 and 91 and two interface entities 83 and 84. Interface entity 83 produces an event 92, which is passed to the service entity 81 via the service bus 7. After receiving the event 92, the service entity 81 produces an event 93, which is passed to the service entity 91 via the service bus 7. After receiving the event 93, the service entity 91 produces event 94, which is passed to the service entity 81 via the service bus 7. After receiving the event 94, the service entity 81 produces an event 95, which is passed to the interface entity 83 via the service bus 7.

In passing an event between entities, as illustrated in FIGS. 10 and 11, the service bus 7 determines the destination for the event. The service bus 7 determines that an event must be passed from one entity to another entity by looking at the type and classification of the event.

EXAMPLES

Figure 12:
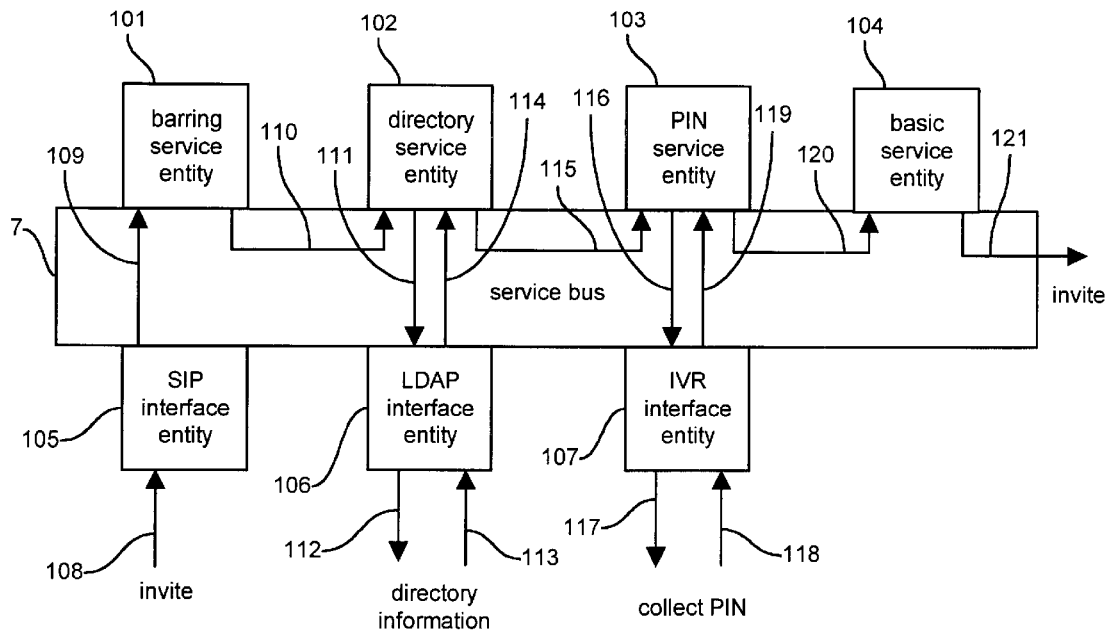
FIG. 12 illustrates a first example for providing services using the invention.

FIG. 12 illustrates a first example for providing services using the invention. In FIG. 12, an originating call from a user of the service provider 1 is illustrated. An originating call occurs for a call outgoing form the user. The user has subscribed to four services of the service provider 1, and the four services are implemented for the user with four service entities 101–104. When the user initiates the originating call, blocks 51–53 of FIG. 7 are performed, and the service entities 101–104 and the interface entities 105–107 are dynamically installed onto the service bus 7.

The barring service entity 101 provides a service which restricts certain types of calls. The directory service entity 102 provides the ability to translate a name into a number using a directory. The personal identification number (PIN) service entity 103 provides the ability to prompt a user for a PIN before making a toll or long distance call. The basic service entity 104 provides basic call functions such as routing, answer, and release.

The service bus 7 couples the four service entities 101–104 to three interface entities 105–107. The session initiation protocol (SIP) interface entity 105 provides access to IP telephony functions and is coupled to a communication system for signaling call control information. The lightweight directory application protocol (LDAP) interface entity 106 provides access to directory information and is coupled to a communication system for requesting and relaying directory info. The interactive voice response (IVR) interface entity provides announcements and digit collection for prompt based services and is coupled to a communication system for requesting and controlling voice playback and digit reception equipment.

For an originating call, an invite 108 is received by the interface entity 105. The invite 108 is an initial call request protocol message. The interface entity 105 produces an event 109, which is passed to the service entity 101 via the service bus 7. After receiving the event 109, the service entity 101 produces an event 110, which is passed to the service entity 102 via the service bus 7. After receiving the event 110, the service entity 102 produces an event 111, which is passed to the interface entity 106 via the service bus 7.

After receiving the event 111, the interface entity 106 produces a directory request protocol message 112 requesting directory information and receives a directory response protocol message 113 with the directory information. After receiving the directory response protocol message 113, the interface entity 106 produces an event 114, which is passed to the service entity 102 via the service bus 7. After receiving the event 114, the service entity 102 produces an event 115, which is passed to the service entity 103 via the service bus 7. After receiving the event 115, the service entity 103 produces an event 116, which is passed to the interface entity 107 via the service bus 7.

After receiving the event 116, the interface entity 107 produces an IVR request protocol message 117 to collect a PIN and receives an IVR response protocol message 118 with the collected PIN. After receiving the IVR response protocol message 118, the interface entity 107 produces an event 119, which is passed to the service entity 103 via the service bus 7. After receiving the event 119, the service entity 103 produces an event 120, which is passed to the service entity 104 via the service bus 7. After receiving the event 120, the service entity 104 produces an event 121, which is passed by the service bus 7 as an invite. The invite for the event 121 is a continuation of the initial call request of invite 108.

Figure 13:
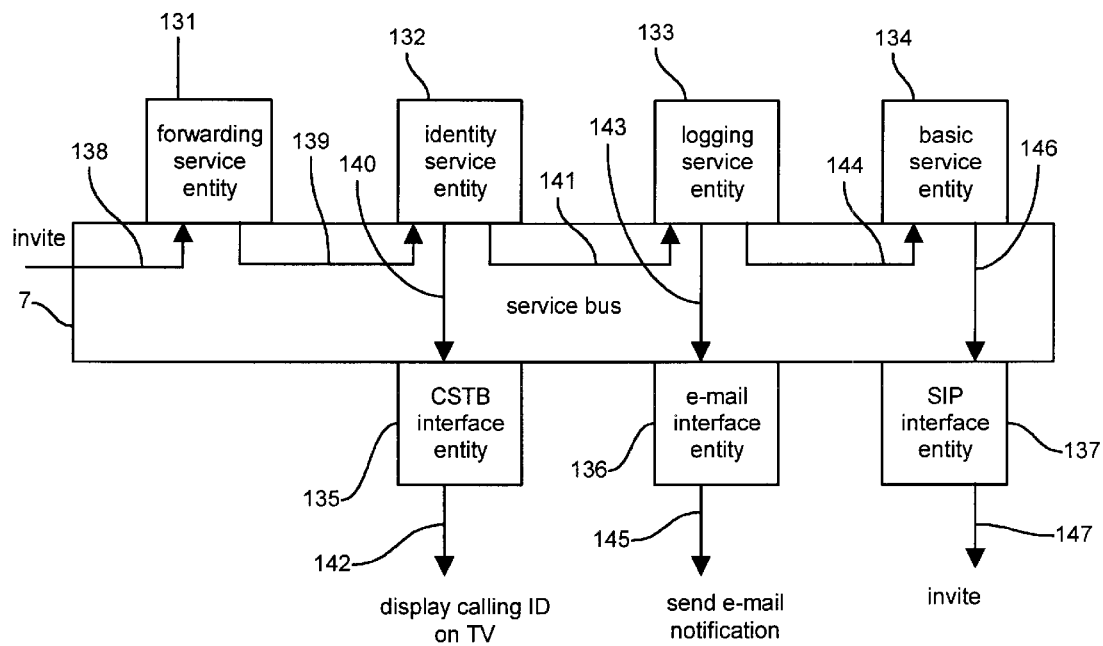
FIG. 13 illustrates a second example for providing services using the invention.
Figure 14:
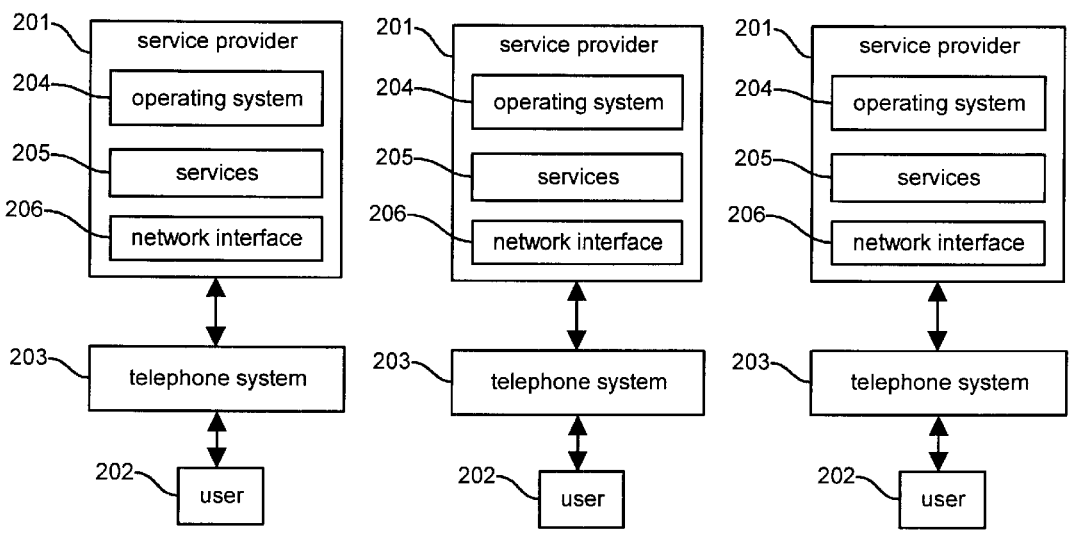
FIG. 14 illustrates a system perspective for providing services using the prior art.

FIG. 13 illustrates a second example for providing services using the invention. In FIG. 13, an example of a terminating call, which is a call incoming to a user of the service provider 1, is illustrated. The user has subscribed to four services of the service provider 1, and the four services are implemented for the user with four service entities 131–134. When the terminating call is received by the service provider 1, blocks 51–53 of FIG. 7 are performed, and the service entities 131–134 and the interface entities 135–137 are dynamically installed onto the service bus 7.

The forwarding service entity 131 provides the capability to forward a call to another destination given certain criteria. The identity service entity 132 provides the capability to notify a user of a call attempt by displaying the call information on a user premise device (e.g., a cable set top box). The logging service entity 133 provides the capability to log via e-mail all call attempts. The basic service entity 134 has the same functions as the basic service entity 104 illustrated in FIG. 12. Even though basic service entities 104 and 134 implement the service offered by the service provider 1, two service entities are used because two users have subscribed to the same service, namely the basic service, and a service entity is generated for each subscription to the basic service.

The service bus couples the four service entities 131–134 to three interface entities 135–137. The cable set top box (CSTB) interface entity 135 provides an interface to a CSTB and is coupled to a communication system for displaying information on a television. The e-mail interface entity 136 provides an interface to an e-mail server and is coupled to a communication system for dispatching e-mail. The SIP interface entity 137 has the same functions as the SIP interface entity 105 illustrated in FIG. 12.

The service bus 7 passes an event 138 to the service entity 131. The event 138 is an invite for an incoming call setup. For instance, the event 138 can be a continuation of event 121 in FIG. 12, if the requested call of FIG. 12 is made to from a user of the service provider 1 to another user of the service provider 1. After receiving the event 138, the service entity 131 produces an event 139, which is passed to the service entity 132 via the service bus 7. After receiving the event 139, the service entity 132 produces event 140, which is passed to the interface entity 135 via the service bus 7, and produces event 141, which is passed to the service entity 133 via the service bus 7.

After receiving the event 140, the interface entity 135 produces a notification protocol message 142 to the CSTB to display the calling line information 142. The notification protocol message 142 causes a caller identification to be displayed on a television monitor of the user. After receiving the event 141, the service entity 133 produces an event 143, which is passed to the interface entity 135 via the service bus 7, and produces an event 144, which is passed to the service entity 134 via the service bus 7. After receiving the event 143, the interface entity 135 produces an outgoing e-mail request protocol message 145. The outgoing e-mail request protocol message 145 results in an e-mail notification being sent to the user specified address. After receiving the event 144, the service entity 104 produces an event 146, which is passed to the interface entity 137 via the service bus 7. After receiving the event 146, the interface entity 105 produces an invite protocol message 147. The invite protocol message 147 is an invite to the terminating endpoint.

The invention has been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A computer system for providing services having a computer-readable medium embodying software to operate a computer, comprising:

a plurality of software-implemented service entities, each service entity comprising at least one of a reusable macro function, an application programming interface function, and a management interface function, each service entity producing and receiving events, each service entity corresponding to a user subscription to a service;

a plurality of software-implemented interface entities, each interface entity coupled to a communication system and communicating with the communication system using a communication protocol, each interface entity producing and receiving events; and a software-implemented service bus coupling the interface entities and the service entities, the service bus passing events between the interface entities and the service entities and between the service entities.

2. A system as in claim 1, wherein the service bus comprises a software-implemented service registry listing the services provided by the system.

3. A system as in claim 1, wherein the service bus comprises a software-implemented service registry listing users authorized to access the computer system.

4. A system as in claim 1, wherein the service bus comprises a software-implemented service registry listing relationships between the service entities and users authorized to access the computer system.

5. A system as in claim 1, wherein at least one management interface function of a service entity provides for at least one of provisioning, monitoring, and modification of the service entity.

6. A system as in claim 1, further comprising a library storing at least one of a reusable macro function, an application programming interface function, and a management interface function used by a service entity.

7. A system as in claim 1, wherein the service bus is distributed across a network.

8. A system as in claim 1, wherein the service entities are distributed across a network.

9. A method for operating a computer system for providing services having a computer-readable medium embodying software to operate a computer, the software comprising a plurality of software-implemented service entities, a plurality of software-implemented interface entities, and a software-implemented service bus, the method comprising the steps of:

providing a first service entity coupled to the service bus and a first interface entity coupled to the service bus;

passing a first event from the first interface entity to the first service entity via the service bus; and passing a second event via the service bus from the first service entity to one of the first interface entity, a second interface entity coupled to the service bus, and a second service entity coupled to the service bus.

10. A method as in claim 9, further comprising the step of passing a third event from the second service entity to the second interface entity via the service bus.

11. A method as in claim 9, further comprising the step of passing a fourth event from the second service entity to the first service entity via the service bus.

12. A method as in claim 11, further comprising the step of passing a fifth event from the first service entity to the first interface entity via the service bus.

13. A method as in claim 9, further comprising the step of passing a six event from the second service entity to a third service entity via the service bus.

14. A method as in claim 9, further comprising the step of determining an order of response to pass a seventh event from an interface entity or a service entity if at least two entities are to receive the third event.

15. A method as in claim 9, further comprising the steps of:

receiving a request from a user to access the system;

verifying the user is authorized to access the system by using a service registry;

determining the services to which the user has subscribed;

dynamically installing onto the service bus the service entities corresponding to the subscribed services; and dynamically installing onto the service bus the interface entities required by the dynamically installed service entities and not being coupled to the service bus.

16. A method as in claim 15, further comprising the steps of:

dynamically uninstalling from the service bus the service entities corresponding to the subscribed services; and dynamically uninstalling from the service bus the interface entities not being used by the service entities coupled to the service bus.

17. A method as in claim 9, further comprising the step of dynamically installing onto the service bus a service entity or an interface entity with the plurality of service entities or the plurality of interface entities, respectively.

18. A method as in claim 9, further comprising the steps of detecting an error in a service entity or an interface entity and resetting the service entity or the interface entity having the detected error.

19. A method as in claim 9, further comprising the steps of:

detecting an incorrect event received from the service bus in a service entity or an interface entity;

sending an error message to the service bus from the service entity or the interface entity detecting the incorrect received event;

logging the error message;

sending a reset message to the service entity or the interface entity detecting the incorrect received event from the service bus; and resetting the service entity or the interface entity detecting the incorrect received event.

20. A computer system for performing the method of claim 9.

21. A computer-readable medium comprising software for performing the method of claim 9.

* * * * *